Aug. 21, 1923.
V. L. ANDREW
1,465,404
WIND WHEEL HUB FOR WINDMILLS
Filed Oct. 5, 1922
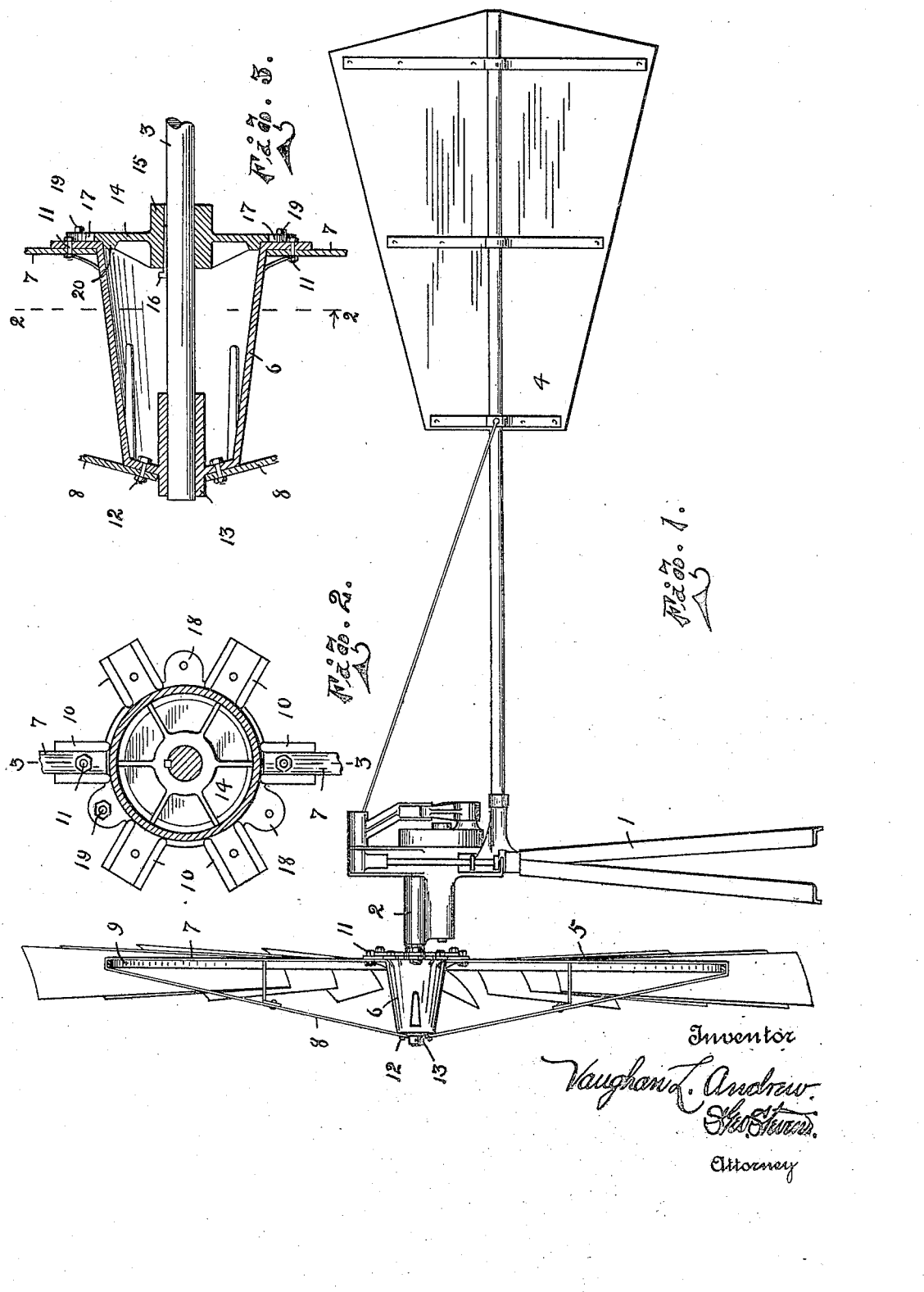

Patented Aug. 21, 1923.

1,465,404

UNITED STATES PATENT OFFICE.

VAUGHAN L. ANDREW, OF SUPERIOR, WISCONSIN.

WIND-WHEEL HUB FOR WINDMILLS.

Application filed October 5, 1922. Serial No. 592,657.

*To all whom it may concern:*

Be it known that I, VAUGHAN L. ANDREW, a citizen of the United States, residing at Superior, in the county of Douglas and State of Wisconsin, have invented certain new and useful Improvements in Wind-Wheel Hubs for Windmills, of which the following is a specification, reference being had therein to the accompanying drawing.

This invention relates to windmills and has special reference to the wind wheel hub for such.

The principal object of the invention is to provide a novel form of separable hub whereby to simplify the erection of the mill and to insure the same being properly accomplished, as well as providing convenience in the dis-assembly of the mill, or parts thereof necessitating the removal of the wheel for repairs or the like.

For a full appreciation of my invention attention is directed to the following:

Windmills are used principally on farms, and are shipped knocked down with the wheel and tower in dis-assembled parts; the wheel, for example, usually separated into six or eight sections depending upon the size thereof. There are ordinarily two methods of erecting such windmills, the first being to assemble the tower in a horizontal position on the ground placing thereon the wind wheel. Then by means of ropes, tackles, etc., the completely assembled unit is raised to a vertical position when it is properly anchored in place. The second method is to erect the tower from the ground up, piece by piece, using the parts thereof for staging. Then after the tower is erected, the wind wheel is assembled thereon by hoisting its various parts to the top of the tower and assembling it there. This latter is really the better method when considering the inexperience of the average purchaser, lack of tools, etc., for practicing the first described method.

However the principal difficulty experienced in practicing the latter method is met in the proper assembling of the various parts of the wheel and properly securing same upon the main shaft of the windmill, and, as before stated, the principal object of my present invention is to simplify this feature of the erection in making it possible to assemble the wheel in its entirety upon the ground, or, in the event of its being a small wheel, at the factory, when the same, being provided with my novel form of separable hub, may be conveniently hoisted into position and mounted upon the shaft in the windmill head on the tower.

Other objects and advantages of the invention will appear in the further description thereof.

Referring to the accompanying drawing forming part of this application in which like reference characters indicate like parts:

Figure 1 is a side elevation of a windmill power unit somewhat broken away for convenience in illustration, Figure 2 is a section on the line 2—2, Figure 3, and Figure 3 is a section on the line 3—3, Figure 2.

1 represents the upper end of the tower upon which the windmill is erected, 2 the head of the windmill including the main power shaft 3 and other parts of the power transmitting mechanism, while 4 is the windmill vane and 5 the assembled wind wheel mounted upon the free end of the power shaft in the head 2.

6 represents an elongated tapered hollow hub, common to such windmill construction and which carries the combined spokes and brace elements.

In the construction here illustrated that part of the last mentioned element referred to as the spoke is illustrated at 7, and the brace portion thereof at 8; though in this embodiment the same piece of metal comprises both the spoke and the brace, as it extends radially from the hub 6 outwardly to the circumferential blade supporting rim 9 where it is fastened and then extends downwardly radially to the opposite end of the hub forming the brace 8. Radially projecting lugs 10 are formed integral with the larger end of the hub 6 for the reception of the inner ends of the spokes 7 and to which they are securely bolted as at 11, while the inner ends of the braces 8 are attached as at 12 to the smaller end of the hub. The smaller end of the hub is provided with a slightly protruding sleeve 13, the same being of considerable length to form a convenient bearing about the shaft 3.

The inner or larger end of the hub 6 is provided with a separable head 14 which head has an axial hub 15, said hub being designed to be securely attached to the shaft 3 in any desired manner as for example by the driving key 16. Radially extending from the circumferential edge of the head 14 are a plurality of lugs 17, and, extending from the outermost edge of the larger end of the hub 6 intermediate of the lugs 10, are similar lugs 18, with which the lugs 17 are designed to register when the hub and the head therefor are assembled, there being registering holes through the lugs 17 and 18 which are provided with bolts as indicated at 19 for securely uniting same. These bolts being external of the hub make them convenient of access for application or removal as desired.

Concentrically about the inner face of the head 14 is formed an inwardly projecting shoulder 20 which has a slightly tapered circumferential face upon which the large end of the hub 6 snugly fits when drawn home by the bolts 19, insuring a proper union of the cooperative parts.

From the foregoing it is evident that the wind wheel and hub 6 may be completely assembled any place desired, and that when the head of the windmill is assembled upon the tower with the shaft 3 therein, the head 14 of the hub 6 may be also securely placed in position, there being no inconvenience or annoyance whatever in the handling of the head during the time of its erection. Then when the wind wheel is hoisted into position it may be easily slipped onto the outer free end of the shaft 3, the hub 13 acting as a guide and bearing about the free end of the shaft when the lugs 17 and 18 may be easily made to register, the bolts applied therein, and the wheel in this manner mounted in position.

Furthermore it is quite obvious that this novel structure is not only convenient in the erection of a windmill, but in the event of accident happening to any portion of the power assembly, requiring the dismantling of the wind wheel, it is equally advantageous.

Having thus described my invention what I claim and desire to secure by Letters Patent, is:

1. A windmill wheel hub of the character described comprising an elongated hollow body portion, a sleeve like bearing integral with one end of the hub, a separable head for the opposite end of the hub having a hub like axial portion therein, and means for rigidly uniting the head with the hub.

2. A shaft and wheel hub assembly of the character described comprising a hub head rigidly fixed to the shaft, and an elongated wheel carrying hub separably attached to the head at one end and freely supported on the shaft at the opposite end.

3. A wind wheel hub of the character described comprising an elongated hollow body portion, an axial shaft bearing integral with the outermost end of the hub, means for attaching wheel rim supports to the outermost end of the hub, means for attaching wheel rim supports to the innermost end of the hub, a head for the innermost end of the hub having an axial hub enlargement for rigid attachment to a shaft, and means for engagement with the innermost end of the body portion of the hub intermediate of the wheel rim supports to the latter.

4. A wind mill wheel hub and shaft assembly comprising a hollow wheel supporting hub and a sleeve like axial free bearing for engagement with the shaft at its outer end and a separable head at the opposite end for fixed engagement with the shaft for the purpose described.

5. A shaft and wheel hub assembly of the character described comprising a hub head for rigid attachment to the shaft, an inwardly projecting concentric tapered shoulder upon said head, an elongated hollow wheel hub one end of which is registerable with the shoulder upon the head, and the other end freely supported upon the shaft, and means for rigidly uniting the hub and head.

In testimony whereof I hereunto affix my signature in the presence of two witnesses.

VAUGHAN L. ANDREW.

Witnesses:
S. C. BRONSON,
S. GEO. STEVENS.